3,573,905
METHOD OF PRODUCING ELECTROPHOTOSENSITIVE CADMIUM SULFIDE WITH CRYSTALS OF A HEXAGONALITY OF LESS THAN 80%
Katsuo Makino and Iwao Sawato, Kanagawa, Japan, assignors to Fuji Shashin Film Kabushiki Kaisha, Kanagawa, Japan
Filed June 10, 1966, Ser. No. 556,648
Claims priority, application Japan, June 11, 1965, 40/34,320
Int. Cl. C01f 7/70, 7/72, 7/74
U.S. Cl. 96—1.5          8 Claims

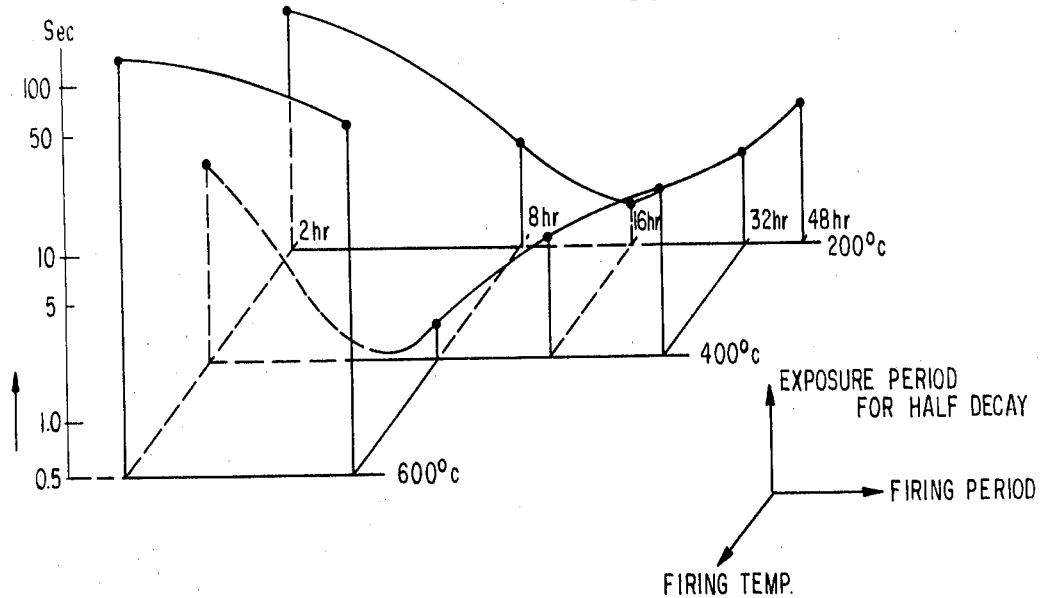
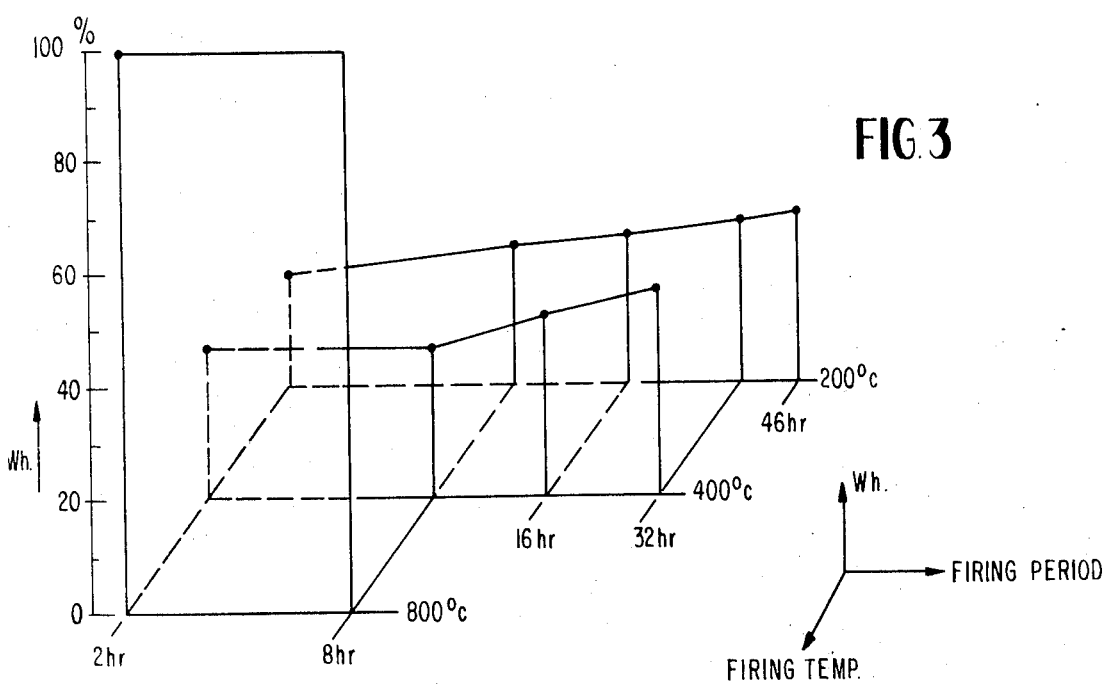

ABSTRACT OF THE DISCLOSURE

A method for producing an electrophotosensitive material composed mainly of cadmium sulfide by heating a powder of the sulfide in a temperature range from 100° C. to 500° C. for a period of time greater than 2 hours but not longer than 48 hours so that the dimensions of the powder particles do not become larger than 1.5 microns and the percentage of hexagonality of the crystalline powder is less than 80% after the period of heat treatment.

---

Figure 1:
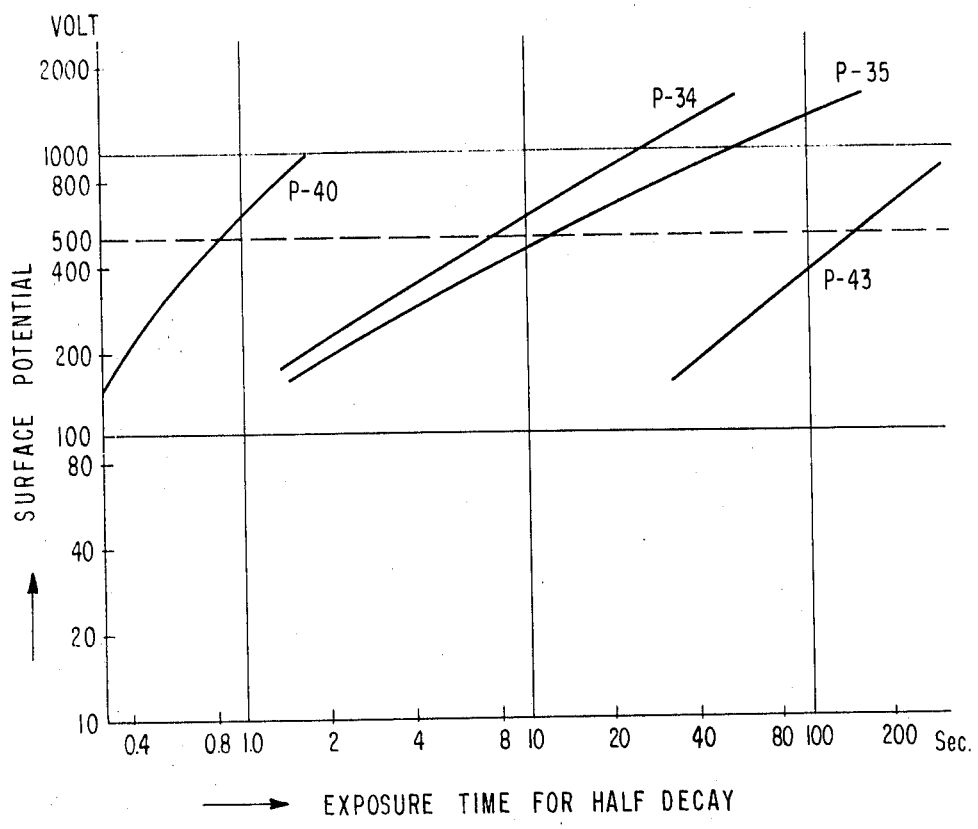

The present invention relates to a method of producing an electrophotographic light-sensitive element, and in particular to a photoconductive insulating coating consisting of a dispersion admixture mainly composed of a photoconductive, finely divided powder of cadmium sulfide and a binder for use in highly sensitive electrophotography.

In the art of electrophotography, it has been known to employ a certain kind of photoconductive, inorganic material as a photoconductive insulating material. For instance, there are illustrated sulfur, selenium; oxides, sulfides, or selenides of zinc, cadmium, mercury, antimony, bismuth, lead and the like, and titanium oxide. These materials are formed in a layer on the surface of a support, such as a metallic base plate and a paper. In some cases, these materials may be dispersed in a binder composed of an electrically insulating resin, and the resulting admixture is formed into a photoconductive insulating layer. Among these materials, selenium and zinc oxide have been most well known and have most widely been put into practical use.

Selenium is applied, in the form of vitreous selenium, to the surface of a metallic plate, especially an aluminum plate to form a layer thereon, and is used for a light-sensitive member which is is to be repeatedly used. The sensitivity of the thus prepared plate corresponds to ASA2–10, which is considered to be the highest among those exhibited by electrophotographic materials hitherto known. In addition, since the vitreous selenium has high hardness and gives a mirror-like surface, the light-sensitive member is very suitable for repeated use.

As hereinbefore described, the vitreous selenium has excellent characteristics; however, it also has some disadvantages as follows. Namely, the production thereof is very difficult.

A uniform film of vitreous selenium is usually prepared by vacuum evaporation, which requires large-scale vacuum evaporation equipment and hence it reduces production efficiency. Further, in the case of employing a vacuum evaporation process, the control of additives to be incorporated thereinto for improving the properties of an electrophotoconductive material, such as photosensitivity, is very difficult. Moreover, the vitreous selenium, which is in a certain kind of solid phase as presented by supercooled selenium, tends to crystallize by the action of heat or upon contamination by moisture in air or other substances. As a result, the quality thereof rapidly deteriorates and the durable life is shortened when used under conditions of elevated temperature and at high humidity. On the other hand, zinc oxide is caused to disperse in a binder composed of an electrically insulating resin, and the resulting admixture is applied on the surface of a paper, followed by drying, to produce an electrostatic, electrophotographic member known by the name of photosensitive paper.

The photosensitive paper thus produced has a sensitivity of ASA 0.01–0.2 and an optical image can be directly formed and fixed thereon owing to its almost white appearance. Although the admixture containing zinc oxide may also be sprayed on the surface of a metallic plate to produce an electrophotographic member, it has not been put into practical use for an electrophotographic member capable of repeated use, because it has a lower film hardness and a lower photographic speed when compared with those of a member composed of the selenium. Once exposed to light, furthermore, the quality thereof becomes worse with the result that it becomes unfit for continuous repeated use. In the case of employing a member composed of zinc oxide, some attempts, comprising the step of adding various kinds of sensitizing dyes thereto, were carried out to increase overall photographic speed. These dyes, however, were unstable under the influence of heat, and the electrophotographic member containing the dyes was relatively rapidly deteriorated by the influence of corona-discharge or light-irradiation, so that the durable life of the member was far shorter than that of an electrophotographic member made from selenium.

In order to overcome the disadvantages mentioned above, the following has been proposed. An electrostatic, electrophotosensitive member has been prepared by the steps of causing finely divided cadmium sulfide having an average particle size of about 0.2 micron to be dispersed in a solution composed of a thermosetting resin having a volume specific resistance of at least $10^{11}$ ohm-cm. and a solvent, applying the resulting suspension on the surface of a suitable supporting member, such as a metallic plate, and heating the member for promoting the setting of the resin and simultaneously for imparting heat to the cadmium sulfide powder-resin system. The cadmium sulfide powder employed therein is extremely small, i.e., about 0.2 micron, in average particle diameter. It is therefore mainly prepared by means of a wet-process. The powder has been considered to be more preferable if it was accompanied with no impurity and is a stoichiometrically perfect compound. We have, thereafter, found the fact that finely divided cadmium sulfide particles come to have a photographic speed approximately ten times as high as that of the particles not yet fired, by subjecting finely divided cadmium sulfide particles coming from the wet-process to firing at a temperature for a period of time. Employing the cadmium sulfide thus produced as a starting material, we have succeeded in manufacturing an electrostatic electrophotosensitive member having a photosensitivity which is comparable with that of a member made of selenium and higher than that of a member made from zinc oxide.

An object of this invention is to overcome the disadvantages inherent in an electrostatic electrophotosensitive material made from vitreous selenium or zinc oxide, by providing a simple and improved method of producing a photosensitive material, which has a photosensitivity equal to more than that of an electrophotosensitive material made from the vitreous selenium, is stable under the influence of heat, and has a sufficiently low pre-exposure effect, for use in electrostatic electrophotography.

Since the thickness of a photosensitive layer of an electrostatic photosensitive member is of the order of about 5–100 microns, it is practically impossible to employ photoconductive pigment having a particle size greater than 1.5 microns for preparing a photosensitive, film-like coating, owing to the fact that the large dimension of the particle causes the photographic quality to be deteriorated to a great extent. When a pigment of such a larger dimension is employed, the photographic quality of the resulting member deteriorates; the electrostatic charge retainability in a dark place is lowered, and the residual potential becomes higher resulting in the high background density.

In addition to this, the member comes to exhibit a surface appearance which is granulated photographically. For the purpose of overcoming these disadvantages, it is desirable to employ a pigment of smaller particle size, viz., a pigment of at least such average particle size as to be not greater than 1.5 microns is required therefor.

Such a finely powdered cadmium sulfide is most favorably produced on an industrial scale by a method comprising passing hydrogen sulfide into an aqueous solution of a water-soluble cadmium salt. The crystal structure and the particle size of the crystalline grain produced depend undoubtedly on the sort of cadmium salt employed, the concentration of the aqueous solution of the salt, the pH value and the temperature at which the aqueous solution is maintained during the course of the reaction. However, a crystalline grain belonging to cubic structure is formed, followed by allowing the material to precipitate in general. The composition of the aqueous solution employed therein actually influences the photoelectric properties of powdered cadmium sulfide to be formed. During the course of an investigation of the crystalline grain, we have found that the grain containing no impurities and being of a stoichiometrically perfect compound was desirable, wherein the grain was a powder-like one, the major portion of which, more than 90 percent, has a cubic structure.

In general, cadmium sulfide has widely been used for a highly sensitive photocell. The cadmium sulfide has been prepared by prior art comprising adding a foreign component, such as cadmium chloride and copper chloride, to a cadmium sulfide powder, and subject the resulting admixture to sintering. The temperature at which the admixture is sintered is approximately 600° C. or higher. The sintering of the admixture and the crystal growth are promoted by virtue of a flux, such as cadmium chloride and the like.

Each cadmium sulfide particle is fused to each other in a cadmium sulfide cell manufactured by employing the cadmium sulfide thus produced, and a major portion of which, more than 90%, has a hexagonal structure. The electric resistance in a dark place is too low to be fit for use as an electrostatic photosensitive material. Accordingly, cadmium sulfide conventionally employed for manufacturing a cadmium sulfide photocell in accordance with previous arts is quite different from one produced according to this invention, and cannot be employed as an electrostatic photosensitive material.

A feature of this invention lies in the production of an electrostatic photosensitive material by the steps of firing a finely divided, crystalline cadmium sulfide, the major portion of which belongs to a cubic system, at a condition beyond which each crystalline particle fuses to each other with the result that the crystal growth to a great extent and the cadmium sulfide is converted to one belonging to an hexagonal system, and causing the cadmium sulfide thus sintered to disperse in a binder having an electrically insulating property.

According to this invention, the electrostatic, photographic property thereof is greatly improved; namely the electrostatic, photographic photosensitivity becomes about ten times higher than that of one not yet fired without lowering the electrostatic charge retainability in a dark place.

The invention will be more particularly illustrated by the following examples.

EXAMPLE 1

An aqueous solution of a water-soluble cadmium salt is caused to react with hydrogen sulfide passed therethrough, to precipitate cadmium sulfide, the major portion of which belongs to a cubic system, and the cadmium sulfide recovered is washed with distilled water until the washing presents no ionic conduction, followed by drying. The characteristics of the powder thus prepared and designated as sample P-34 are shown in Table 1.

Cadmium sulfide shows dimorphism of hexagonal and cubic structures. The crystal which actually exists, however, cannot perfectly be classified into either one belonging to cubic structure or the other belonging to hexagonal structure. In other words, crystals belonging either to the former or to the latter are arranged disordered within a mass of crystals. When the mass of crystals is fired at an elevated temperature higher than 600° C., the crystals amounting to more than 99% therein come to belong to the hexagonal system. On the other hand, a mass of crystals coming from wet-process at a low temperature contains various amounts of one and the other belonging to cubic and hexagonal structure, respectively, as aforesaid. A variety of methods may be considered for indicating the percentage of both crystals; in this specification, we intend to employ a Formula 1 shown just below:

$W(h)$ = The percentage amount of crystal =

$$4R/(3R+1.33) \times 100\% \qquad (1)$$

belonging to hexagonal system (hexagonality) wherein $$R = I(d=3.58 \text{ A.})/I(d=3.36 \text{ A.}) \qquad (2)$$

As shown from the Formula 2, the R is a ratio of an intensity of a diffracted X-ray at a spacing, $d=3.58$ A. against an intensity of a diffracted X-ray at a spacing $d=3.36$ A. A diffracted X-ray at $d=3.58$ A. comes from the crystal belonging to the hexagonal structure, and a diffracted X-ray at $d=3.36$ A. comes from both crystals belonging to a hexagonal and a cubic structure, respectively. The terms "hexagonality" in Table 1 is a value calculated based on the considerations mentioned above. The figures about the size of the fired particle, in Table 1, resulted from observation by means of an electron microscope, so that they are not accurate.

TABLE 1.—FIRING SCHEDULE AND CHARACTERISTICS OF FIRED PARTICLE

| Sample number | Firing schedule Temp. (° C.) | Time (hr.) | Average size of sintered particle, in diameter (micron) | Hexagonality (percent) | Exposure time for half decay (second) |
|---|---|---|---|---|---|
| P-35 | 200 | 2 | 0.1 | 20.2 | 12 |
| P-36 | 200 | 8 | 0.1 | 25.0 | 2.0 |
| P-37 | 200 | 16 | 0.1 | 26.0 | 0.9 |
| P-38 | 200 | 46 | 0.13 | 30.8 | 7.3 |
| P-39 | 400 | 2 | 0.15 | 26.7 | 7.0 |
| P-40 | 400 | 8 | 0.15 | 27.0 | 0.85 |
| P-41 | 400 | 16 | 0.16 | 32.5 | 2.6 |
| P-42 | 400 | 32 | 0.16 | 36.7 | 4.9 |
| P-43 | 600 | 2 | 0.3 | 99.8 | 150 |
| P-44 | 600 | 8 | 0.45 | 99.3 | 63 |
| P-34 | (¹) | (¹) | 0.09 | 6.6 | 8.5 |

¹ Not fired.

A cadmium sulfide powder of the sample number P-34 was caused to be dispersed in a binder having an electrically insulating property, to prepare an electrostatic electrophotosensitive member; more particularly, the powder P-34 60 g., a thermosetting acrylic resin paint (commercially available under the name "Magicrsn No.

200 Clear" sold by Kansai Paint Co., Ltd.) 50.0 g. (the weight of solid values being 25.0 g.) and a thinner 100 cc. were mixed with each other, and the resulting admixture was blended by means of a porcelain ball mill for 42 hrs. to obtain a photosensitive paint.

The photosensitive paint was then applied on the surface of an aluminum plate to form coatings of various thicknesses, followed by drying, and the coatings were subjected to baking at 150° C. for 30 mins. to obtain electrostatic photosensitive members. The photosensitive member was charged with a negative electrostatic charge by means of corona discharge of minus 7.5 kv., and the electrostatic potentials on the surfaces of the coatings are measured three seconds after the charging, then the surface of the electrostatic photosensitive member is irradiated under an illumination of approximately 15 luxes with a light of a tungsten lamp having a color temperature of 2660° K., and an interval of time at which the surface potential after irradiation becomes half of the initial surface potential (exposure time for half decay) is measured. The surface potential three seconds after charging increases as the thickness of the coating increases. Accordingly, it is convenient to utilize, as a graph indicating the characteristics of the electrophotosensitive paint, a graph showing a relation between the exposure time for half decay and the surface potential, because the thickness of the coating can be estimated, with some accuracy, based on the value of the surface potential three seconds after the charging. FIG. 1 shows characteristics of a typical electrostatic electrophotosensitive paint, wherein the ordinate and abscissa represent the surface potential and the exposure time for half decay, respectively. In FIG. 1, it should be natural to consider the exposure time for half decay exhibited by an electrophotosensitive member having an electrophotosensitive coating of such a thickness that the surface potential thereon becomes 500 volts to represent the typical characteristic of a corresponding electrophotosensitive member. The term of "exposure time for half decay" in Table 1 has such a meaning as explained just above. For example, it is 8.5 seconds for sample P–34, and 12.0 seconds for sample P–35.

Unburnt powder, sample P–34, was fired together with no additive in a quartz crucible provided with a lid under various conditions in air to prepare powder samples having various properties. A number of samples prepared under typical baking conditions are designated as sample P–35, and sample P–44 in Table 1. The hexagonality, the average particle size actually measured by means of an electron microscope, and the exposure time for half decay at which the surface potential, coming from the calculation based on a relation between the exposure time for half decay and the surface potential, both shown in FIG. 1, becomes 500 volts, are put in Table 1. The electrostatic photosensitive paints and the electrostatic photosensitive members were prepared by the same manner as in the case of sample P–34. In order to make the results easier to understand, a relation between the firing condition and the exposure time for half decay is shown in FIG. 2. In FIG. 2, X–Y axes and Z axis represent the firing conditions and the exposure time for half decay, respectively. From FIG. 2, it may be concluded that minimum exposure time for half decay can exist within a range defined by the firing condition of this example, so that the exposure time for half decay increases either as the time becomes greater or not greater, or the firing temperature becomes higher or not higher. The minimum point lies in the firing condition of 350–400° C. and 6–10 hours, through which a valley of the curved surface of the relation between the decay time and firing condition runs. In other words, a firing time at which the exposure time for half decay becomes minimum over a range of the same firing temperature may be present, if the curved surface is cut in section at a point of a certain firing temperature, and the firing time will increase as the firing temperature becomes lower.

FIG. 3 shows the hexagonality, designated as W$h$, wherein X–Y plane indicates the firing condition, and Z axis the W$h$. As shown from FIG. 3, the extent of phase transition from the cubic to the hexagonal is not considerable at a firing temperature of 200° C. or 400° C., and it gradually takes place as the firing time is elongated. At a temperature of 600° C., however, crystal reaching to an amount more than about 99 percent has been converted into the hexagonal structure within a period of the firing time of 2 hours. Comparing the exposure time for half decay in FIG. 2 with the hexagonality, W$h$, in FIG. 3, a W$h$ at which the exposure time for half decay becomes minimum is 26–28%, and the exposure time for half decay is about one hundred times as large as the minimum value, at a W$h$ greater than 90%. In other words, it is necessary to keep the hexagonality W$h$ at mostly less than 80%, and more preferably it should be 20–30%, if one desires to obtain an electrostatic electrophotosensitive member having high photosensitivity. As clearly understood from Table 1, the crystal grain grows up over again into one having a larger size, as the firing temperature becomes higher or the firing time is elongated. Good results are obtained when the baked particle is of an average diameter below 0.2 micron. In case of this, the crystal particles grow about twice as large as that of the raw powder. Typically, the firing temperature extends over a range of 100° C. to 550° C.

In this example, the electrophotosensitive material was applied on an aluminum plate, followed by baking. By means of the baking, powdered cadmium sulfide crystal was further baked. In fact, the exposure time for half decay varied, if an electrophotosensitive material prepared by employing unbaked powder, sample P–34, was subjected to a baking operation of another schedule. The exposure time for half decay became shorter and simultaneously the W$h$, which came from X-ray diffractiometry carried out on the baked coating, becomes slightly higher, as either the baking temperature became higher or the baking time became longer, within a range beyond which the binder was deteriorated by the action of heat.

EXAMPLE 2

As an electrically insulating binder, a binder composed of a resin exhibiting a drying property at the normal temperature was used. A cadmium sulfide baked powder 93 g., a silicon resin (commercially available KR–211 produced by Shinetsu Chemical Industry Co., Ltd.), 22.9 g. and Epoxyester (produced by Nippon Oils & Fat Co., Ltd.) 48 g. were mixed with each other, and the mixture was blended by means of a porcelain ball mill to produce an electrostatic photosensitive paint. The paint was then applied on an aluminum plate, and the plate was dried at room temperature to obtain an electrostatic electrophotosensitive member to be put to the test. It has been found that a relation between the exposure time for half decay, three seconds after the charging, and the baking condition is approximately equal to that in Example 1.

EXAMPLE 3

In the preceding examples, a cadmium sulfide powder was baked in air together with no additive. On the contrary, a cadmium sulfide powder was baked together with copper chloride added thereto, in this example, and similar results have been obtained therefrom. An unbaked powder was added with an aqueous solution of copper chloride, followed by drying, and the resulting powder is processed as in the preceding examples to obtain a baked powder. The baked powder was further processed in the same way as in Example 1 to produce an electrophotosensitive paint and electrostatic electrophotosensitive member with the exception that twice as much binder as the amount employed in Example 1 was employed. Results obtained are shown in Table 2.

TABLE 2.— THE BAKING CONDITION FOR AN UNBAKED POWDER AND ELECTROSTATIC ELECTROPHOTOGRAPHIC QUALITY OF A MEMBER MADE FROM THE BAKED POWDER

| Sample number | $Cu^+/Cd^{++}$ (p.p.m.) | Firing condition Temp. (° C.) | Firing condition Time (hr.) | Baking condition (° C.×min.) | Exposure time for half decay (sec.) |
|---|---|---|---|---|---|
| P-63 | 10 | 200 | 2 | 150 × 30 | 27 |
| P-64 | 10 | 400 | 2 | 150 × 30 | 19.5 |
| P-65 | 10 | 600 | 2 | 150 × 30 | 24.0 |
| P-66 | 100 | 200 | 2 | 150 × 30 | 9.8 |
| P-67 | 100 | 400 | 2 | 150 × 30 | 15 |
| P-68 | 100 | 600 | 2 | 150 × 30 | 26 |

Even if the heat-treatment is carried out whether in air, in a nitrogen stream in vacuum or in a vapor of sulfur, it makes little difference.

What is claimed is:

1. A method for producing an electrophotosensitive material mainly composed of cadmium sulfide comprising heating a cadmium sulfide powder, having a particle size not greater than 1.5 microns and the major portion of which has a cubic crystalline structure, at a temperature in the range of from 100° C. to 550° C. for a period of time greater than 2 hours but not longer than 48 hours, the temperature and time being so controlled that the dimensions of the powder particles do not become larger than 1.5 microns upon growth during the period of the heat treatment, and the percentage of hexagonality of the crystalline powder being lower than 80% after the period of heat treatment, the percentage of hexagonality being represented by the following formula;

$$4R/(3R+1.33) \times 100\%$$

wherein R is equal to a ratio:

$$I(d=3.58 \text{ A.})/I(d=3.36 \text{ A.})$$

and $I(d=3.58 \text{ A.})$ equals the intensity of a diffracted X-ray for a lattice spacing $d=3.58$ A. corresponding to the crystalline powder when it has a hexagonal structure only and $I(d=3.36 \text{ A.})$ equals the intensity of a diffracted X-ray for a lattice spacing $d=3.36$ A. corresponding to the crystalline powder when it has both cubic and hexagonal structures.

2. The method of claim 1 further comprising dispersing the electrophotosensitive material in a binder material having a specific volume resistance of at least $10^{11}$ ohm-centimeters.

3. An electrophotosensitive member comprising an electrically conductive substrate coated with a layer of material produced in accordance with claim 2.

4. A method for producing an electrophotosensitive material mainly composed of cadmium sulfide comprising heating a cadmium sulfide powder, having a particle size not greater than 1.5 microns and the major portion of which has a cubic crystalline structure, at a temperature in the range of from 200° C. to 400° C. for a period of time greater than 2 hours but not longer than 46 hours, the temperature and time being so controlled that the dimensions of the powder particles do not become larger than 1.5 microns upon growth during the period of the heat treatment, and the percentage of hexagonality of the crystalline powder being lower than 80% after the period of heat treatment, the percentage of hexagonality being represented by the following formula:

$$4R/(3R+1.33) \times 100\%$$

wherein R is equal to a ratio:

$$I(d=3.58 \text{ A.})/I(d=3.36 \text{ A.})$$

and $I(d=3.58 \text{ A.})$ equals the intensity of a diffracted X-ray for a lattice spacing $d=3.58$ A. corresponding to the crystalline powder when it has a hexagonal structure only and $I(d=3.35 \text{ A.})$ equals the intensity of a diffracted X-ray for a lattice spacing $d=3.36$ A. corresponding to the crystalline powder when it has both cubic and hexagonal structures.

5. The method of claim 4 further comprising dispersing the electrophotosensitive material in a binder material having a specific volume resistance of at least $10^{11}$ ohm-centimeters.

6. An electrophotosensitive member comprising an electrically conductive substrate coated with a layer of material produced in accordance with claim 5.

7. A method as in claim 4 where the cadmium sulfide powder includes 10–100 p.p.m. of copper in the form of a copper salt.

8. A method as in claim 4 where the percentage of hexagonality is approximately 20–30%.

References Cited

UNITED STATES PATENTS

| 2,884,507 | 4/1959 | Czipott et al. | 252—501 |
| 3,142,586 | 7/1964 | Colman | 252—501X |
| 2,843,914 | 7/1958 | Koury | 23—134X |
| 2,995,474 | 8/1961 | Pearlman | 96—1.5X |
| 3,065,515 | 11/1962 | Antes | 252—501X |
| 3,238,150 | 3/1966 | Behringer et al. | 96—1.5X |
| 3,379,527 | 4/1968 | Corrsin et al. | 96—1.5 |

GEORGE F. LESMES, Primary Examiner

R. E. MARTIN, Assistant Examiner

U.S. Cl. X.R.

23—134